Aug. 7, 1945.  E. P. MILLER  2,381,507
MACHINE FOR SHELLING RICE AND OTHER GRAINS
Filed July 29, 1944  3 Sheets-Sheet 1

Inventor
E. P. Miller
By Lester L. Sargent
Attorney

Aug. 7, 1945.  E. P. MILLER  2,381,507
MACHINE FOR SHELLING RICE AND OTHER GRAINS
Filed July 29, 1944  3 Sheets-Sheet 2

Inventor
E.P.Miller
By Lester L. Sargent
Attorney

Aug. 7, 1945.  E. P. MILLER  2,381,507
MACHINE FOR SHELLING RICE AND OTHER GRAINS
Filed July 29, 1944  3 Sheets-Sheet 3

Inventor
E. P. Miller
By Lester L. Sargent
Attorney

Patented Aug. 7, 1945

2,381,507

UNITED STATES PATENT OFFICE 2,381,507

MACHINE FOR SHELLING RICE AND OTHER GRAINS

Eloir Polite Miller, El Campo, Tex.

Application July 29, 1944, Serial No. 547,166

1 Claim. (Cl. 83—35)

The object of my invention is to provide certain improvements in machines for shelling rice and other hard kernelled grains and particularly to make certain improvements in the machine disclosed in Patent 2,211,096, patented August 13, 1940, to R. H. Brown, and particularly to provide means for keeping the speed of the respective rollers which perform the shelling operation relatively constant whereby to substantially increase the capacity of the machine by five to seven barrels per hour.

Figure 1:
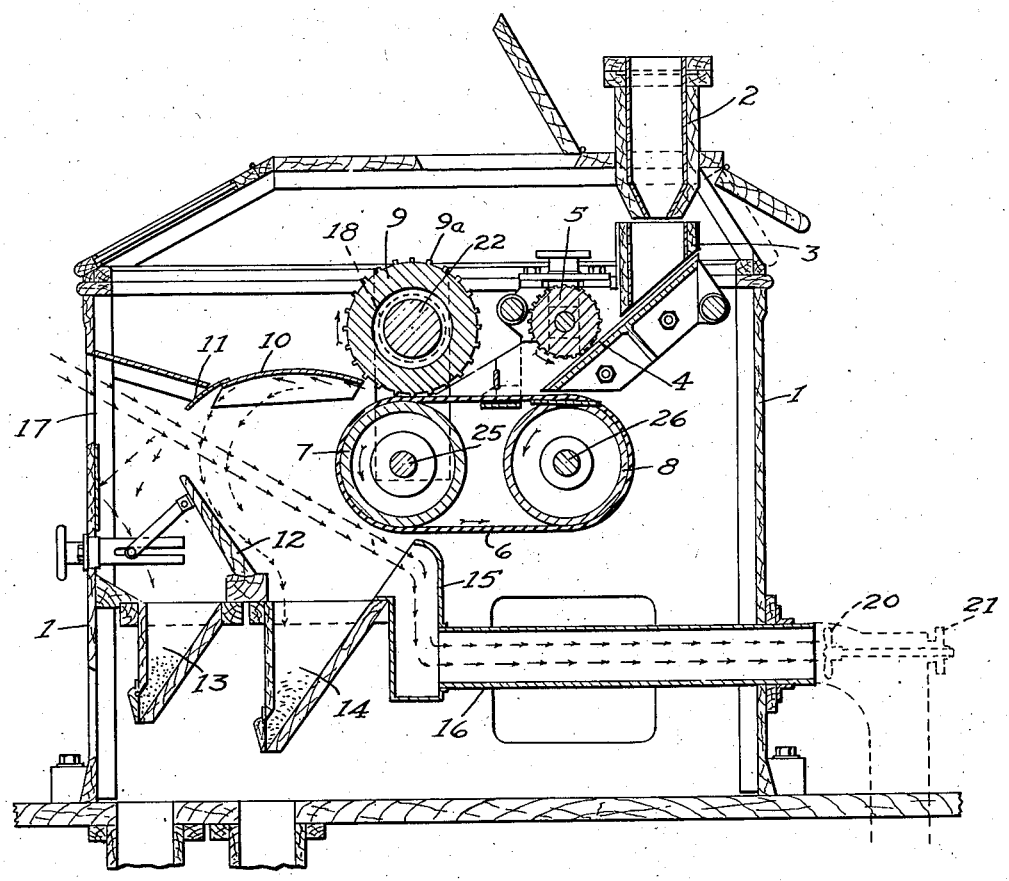
Figure 2:
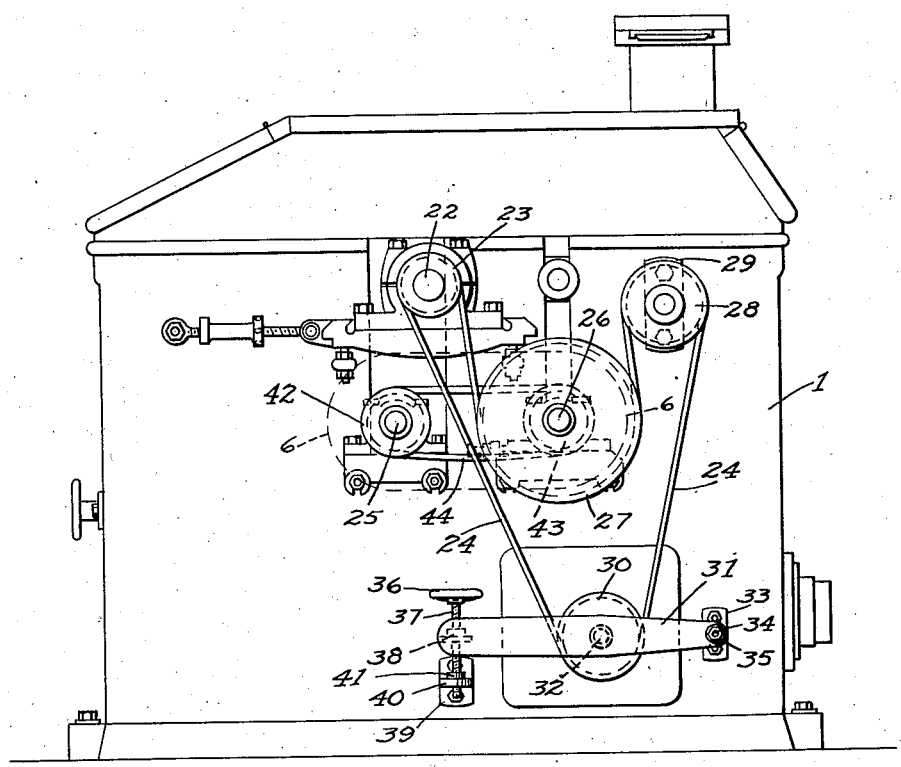
Figure 3:
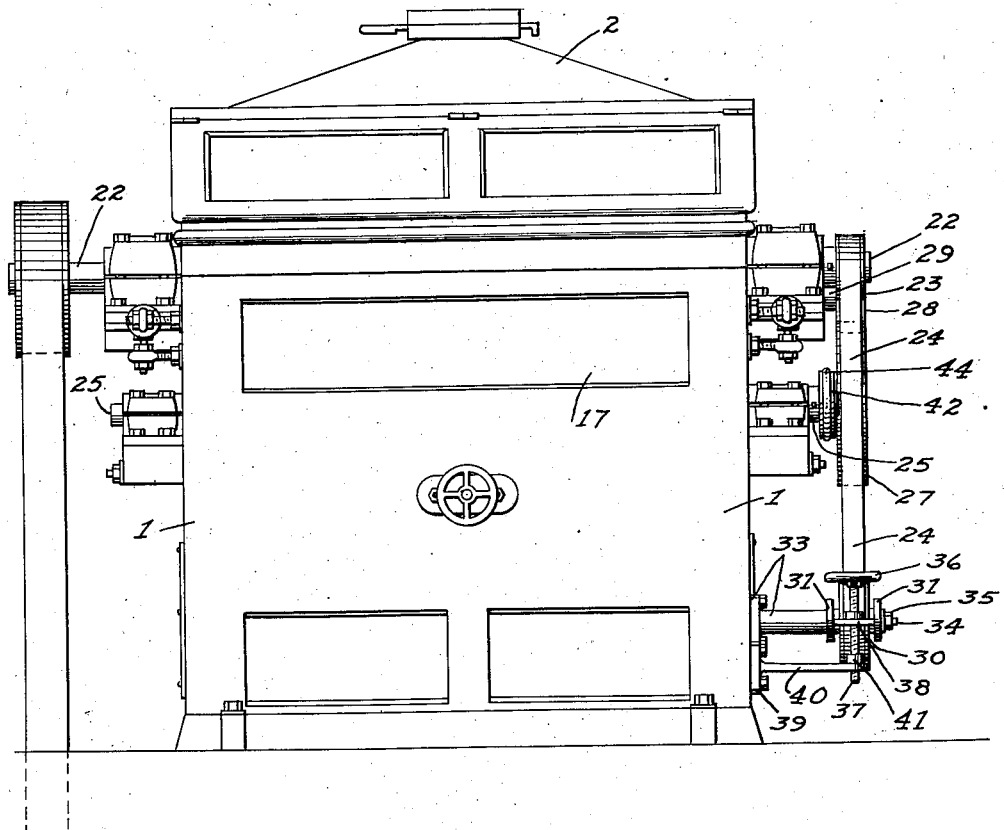

I attain the objectives of my invention by the mechanism illustrated in the accompanying drawings in which Figure 1 is a vertical section through the machine; Fig. 2 is a side elevation of the machine and Fig. 3 is an end elevation of same. Like numerals designate like parts throughout the views and parts which correspond with parts disclosed in Patent 2,211,096 are similarly numeralized.

Referring to the drawings and particularly to Fig. 1, the frame of the machine is indicated by the numeral 1, the grain to be shelled is fed in any suitable manner into the inlet box 2, and thence to feed box 3 and onto an inclined grooved feed plate 4. Above plate 4 is a fluted feed roller 5 which rotates in the direction indicated by the arrow, in a reverse direction to the flow of the grain. The grain then passes to a relatively slow running endless band 6 which is within the machine and which travels over anvil roller 7 and driving roller 8 in the direction indicated by the arrow.

Above the anvil roller 7 is mounted a relatively fast running hard-shelling roller 9, provided with teeth 9a and rotating in the direction indicated by the arrow in Fig. 1. Beyond the roller 9 is a curved impact plate 10 which underlaps a curtain or apron 11 to guide the grain downwardly.

An opening 17 in frame 1 permits the inflow of a current of air past the downflow of grain to distribute the husked grain into compartment 13 and the husks into compartment 14. The current of air is sucked through passages 13 and 14 by means of an intake fan 20 and fan-driving mechanism 21.

Anvil roller 7 is mounted on shaft 25 and driving roller 8 is mounted on shaft 26. A large pulley 27 is also mounted on shaft 26 as shown in Fig. 2.

Referring to Fig. 3, on the power shaft 22 is mounted a pulley 23 over which travels a belt 24. This belt 24 also extends under large pulley 27 and over the upper pulley 28 which is mounted on a bracket 29. Belt 24 then passes over a small lower pulley 30 which is mounted on a stub shaft 32 mounted between the double-sided frame 31 which at one end is pivoted on the stub shaft 34 which, in turn, is mounted on bracket 33. Nut 35 retains pivoted double frame 31 on stub shaft 34.

I provide a handwheel 36 affixed to the threaded shaft 37 which has a threaded engagement with the threaded piece 38 which is affixed to the forward end of the pivoted double frame 31.

Threaded shaft 37 has its lower end threaded in the extension 40 of bracket 39, whereby operation of the handwheel 36 will raise or lower the frame 31 and thus change the tension on belt 24, and, in turn, affect the operation of shaft 26 on which belt 27 is mounted, and of driving roller 8 which also is mounted on shaft 26. Member 41 is a jamb nut to hold the shaft 37 in adjusted position.

Positioned in a plane exteriorly of belt 24 is a pulley 42 mounted on shaft 25 and a pulley 43 mounted on shaft 26. These pulleys are operatively connected by a novel belt 44 of approximately V-shape in cross-section. This belt 44 is taut at the top to hold the tension and is slack at the bottom when the rollers are spinning. The pulleys 42 and 43, which are on the outside of the frame of the machine, prevent the rubber belt 6 which travels on the rollers 7 and 8 from excessive speed as the grain passes between the corrugated roller 18 and the anvil roller 7. Without some device to hold the tension and keep the speed of the respective rollers relatively constant there is a loss in efficiency of five to seven barrels an hour. The rubber belt 6 should run at a speed of approximately 185 R. P. M. and the corrugated roller 18 at a speed of approximately 600 R. P. M. A constant ratio of speed between the rubber belt 6 and the corrugated roller 18 is maintained by the exertion of tension on the two rollers 7 and 8.

What I claim is:

In apparatus of the type described, the combination of a pair of spaced rollers, a slowly running grain-carrying belt of resilient material mounted on the rollers and to which the whole grain is delivered, a high velocity shelling roller having a hard and toothed surface mounted in closely spaced relation above the belt and above the one of said rollers over which grain is discharged, said shelling roller rotating in an opposite direction from the one said belt-carrying roller, to differentially rub and shell grain between the surfaces of the belt and the shelling roller, a shaft, drive receiving means mounted fast on one end of the shaft, said shelling roller being mounted fast to a mid-portion of the shaft, a small diameter driving pulley mounted at the other end of the shaft, a plurality of additional pulleys, a drive belt travelling over said pulleys, one of said pulleys being of a relatively large diameter and directly coupled to the other of the pair of spaced rollers so as to slowly drive the grain carrying belt, a small diameter pulley mounted fast to the large pulley, a second small pulley of similar size mounted fast to the other of the spaced pair of rollers, a second belt passing over said small pulleys, said second belt tending to keep a relatively constant rotational speed as between the pair of spaced rollers, and counteracting the tendency of the grain carrying belt to speed up due to the high speed movement of the grain over the slowly running grain carrying belt.

E. POLITE MILLER.